United States Patent [19]

Fuller

[11] Patent Number: 4,584,718
[45] Date of Patent: Apr. 22, 1986

[54] WATERPROOF ENCLOSURE FOR PORTABLE RADIO OR TAPE PLAYER

[75] Inventor: Kip L. Fuller, Denver, Colo.
[73] Assignee: Product Masters, Inc., Denver, Colo.
[21] Appl. No.: 482,233
[22] Filed: Mar. 31, 1983
[51] Int. Cl.⁴ .............................................. H04B 1/08
[52] U.S. Cl. ................... 455/351; 179/107 E; 179/115.5 BS; 179/182 R; 179/186; 181/149; 381/88
[58] Field of Search ............... 206/811; 455/347, 351, 455/128, 89; 381/25, 69, 88; 179/107 E, 182 R, 182 A, 184, 186, 156 R, 115.5 BS; 367/132; 340/850; 181/149

[56] References Cited

U.S. PATENT DOCUMENTS

| | | | |
|---|---|---|---|
| 3,337,841 | 8/1967 | Wainwright et al. | 367/132 |
| 3,524,951 | 8/1970 | Bernardi et al. | 179/156 A |
| 3,826,987 | 7/1974 | Stevens | 455/351 |
| 3,906,170 | 9/1975 | Guice | 179/184 |
| 4,456,797 | 6/1984 | Olsen | 179/107 E |

*Primary Examiner*—Marc E. Bookbinder
*Attorney, Agent, or Firm*—James R. Young

[57] ABSTRACT

A waterproof enclosure for a portable radio, tape recorder/player, or the like includes a flexible membrane with a finger control pocket adjacent the control knobs of the radio, an opening for inserting and removing the radio from the enclosure with a waterproof sealed cover to close the opening, and a waterproof seal around the earphone plug connector that extends through the flexible membrane. A waterproof earphone speaker is also provided, which has a conical waterproof boot fitted snugly over the speaker. Annular collars on the conical boot anchor the speaker in a person's ear and seal water out of the ear and conical boot.

8 Claims, 4 Drawing Figures

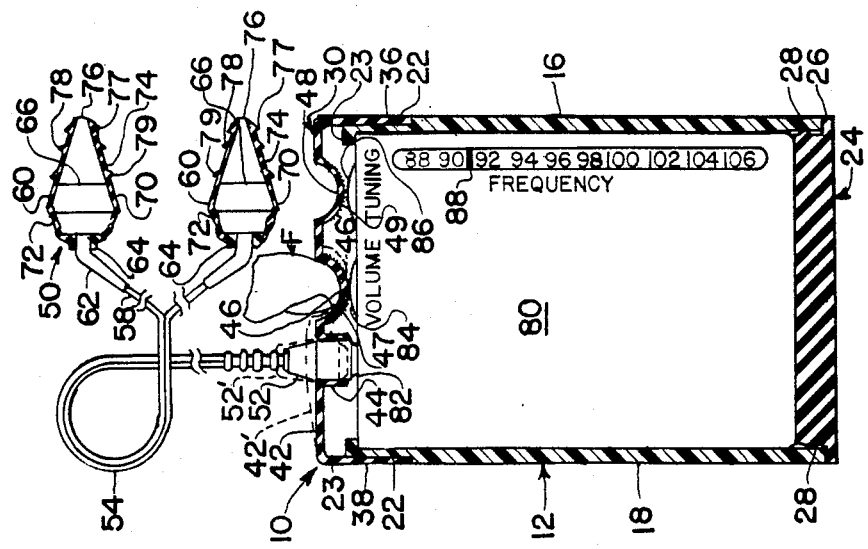

WATERPROOF ENCLOSURE FOR PORTABLE RADIO OR TAPE PLAYER

BACKGROUND OF THE INVENTION

This invention is related to portable radios and tape players, and more specifically, to a waterproof enclosure for portable radios and tape players.

In recent years very small portable radios and tape players have been developed which are lightweight, not bulky, and very easy to carry. These small portable radios and tape players have become quite popular with sports enthusiasts who enjoy listening to music for entertainment while engaging in physical activity and sporting events. Such radios and tape players, however, as currently manufactured are not waterproof, so they cannot be used in water sports activities, such as swimming, surfing, wind surfing, water skiing, and the like. Therefore, prior to the development of this invention, people have not been able to use their portable radios and tape players while engaging in water sports activities.

SUMMARY OF THE INVENTION

Accordingly, it is an object of the present invention to provide a waterproof enclosure for portable radios and tape players.

It is also an object of the present invention to provide a waterproof enclosure for conventional portable radios which allows manipulation of the radio controls from the exterior of the waterproof enclosure without breaking the waterproof seal of the enclosure.

It is also an object of the present invention to provide waterproof earphones for portable radios that can be used by persons engaged in water sports to direct the sound produced by the radio or tape player into the person's ears. The waterproof enclosure for portable radios according to the present invention is comprised of a waterproof housing sized and shaped to contain a portable radio therein, wherein a portion of the waterproof enclosure adjacent the radio control knobs is a flexible, water-impermeable membrane that is easily deformable by an operator's finger and is adapted to engage and allow the user to operate the control knobs of the radio or tape player from the exterior of the enclosure without breaking the waterproof seal. It also includes a waterproof earphone set comprised of a speaker component, electrical wire leads for connecting the speaker component to the radio or tape player, and a waterproof boot for covering the speaker component, preventing water from contacting the connection of the wire leads to the speaker component, for mounting the earphone in a person's ear in a waterproof manner, and for directing sounds produced by the speaker component into the person's ear. The waterproof boot is in the form of an elongated flexible, water-impermeable sleeve, the rear portion of which is positioned over the speaker component and the front portion of which extends forwardly from the speaker component a spaced distance to an opening in the front end thereof for insertion in a person's ear. The forward portion of the sleeve includes a hollow interior converging in cross-sectional area from the larger speaker component to the smaller opening into the ear, preferably in substantially a conical shape.

A plurality of water sealing retainer collars are positioned around the peripheral surface of the forward end of the waterproof boot for sealing the boot in a person's ear and retaining it therein. A plug at the opposite end of the wire leads extends through the flexible membrane in a position where it can be connected to a mating female jack receptacle in the radio or tape player. There is preferably enough flexibility in the membrane surrounding the plug to allow the plug to be unplugged from the radio without breaking the waterproof seal. The membrane also includes a preformed, recessed pocket therein adjacent the control knobs of the radio or tape player to enhance the ability of a person to accurately and precisely manipulate the control knobs from the exterior of the membrane.

DESCRIPTION OF THE DRAWINGS

These and other objects, advantages, and features of the present invention will become more readily appreciated and understood when taken together with the following detailed description in conjunction with the accompanying drawings, in which:

FIG. 2 is a front elevation of the waterproof enclosure and earphones of the present invention;

FIG. 3 is a side elevation of the waterproof enclosure and earphones of the present invention; and FIG. 4 is a cross-sectional view of the waterproof enclosure and earphones of the present invention taken along lines 4—4 of FIG. 3.

DESCRIPTION OF THE PREFERRED EMBODIMENT

Figure 1:
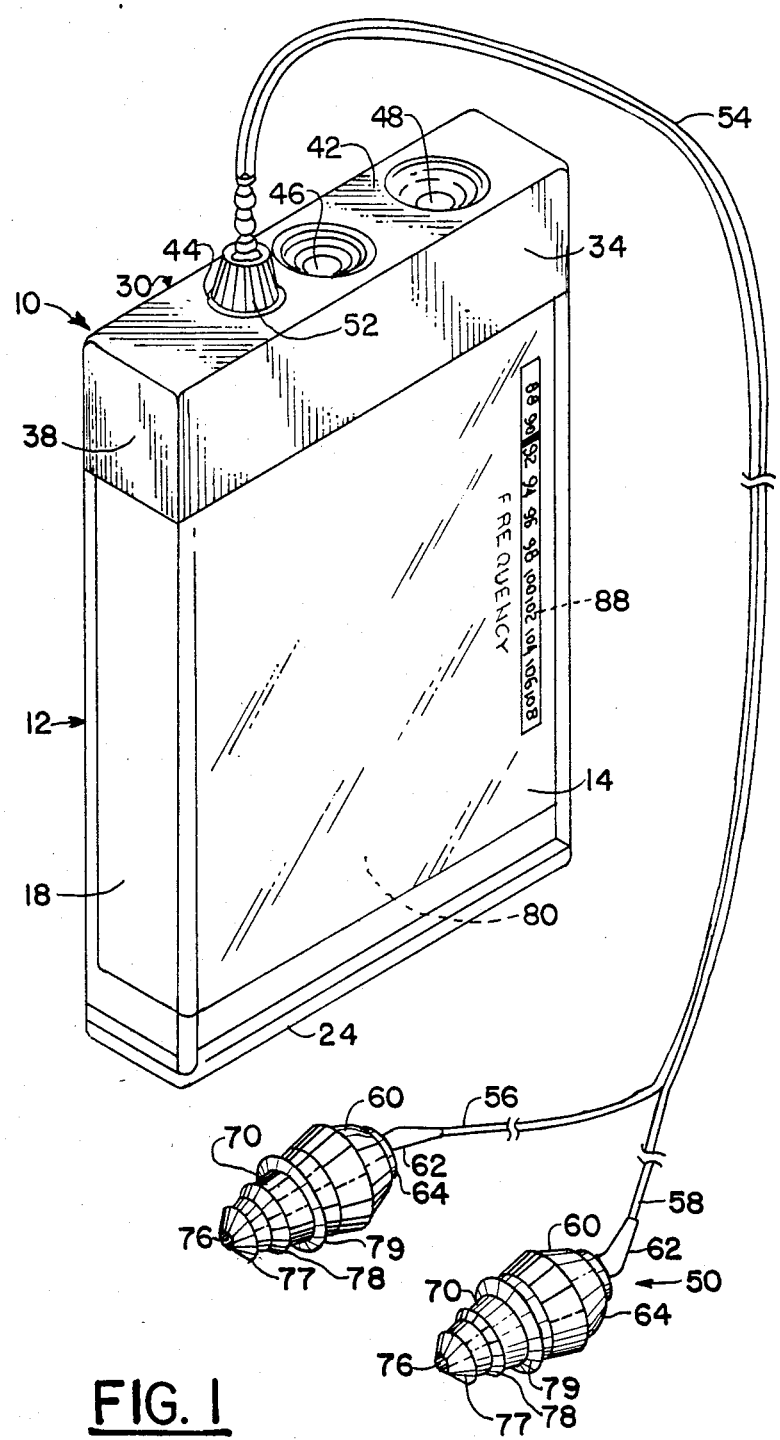
FIG. 1 is a perspective view of the waterproof enclosure and earphones of the present invention.

The waterproof enclosure 10 of the present invention with a portable radio positioned therein is shown in FIGS. 1 and 4, and the enclosure is shown in FIGS. 2 and 3 without a radio positioned therein. Essentially, the waterproof enclosure for the portable radio is comprised of a box-shaped structure 12 having a front panel 14, right side panel 16, left side panel 18, and rear panel 20 that are sized and shaped to define an interior chamber corresponding to the size and shape of a portable radio. A flexible, water-impermeable cover 30 encloses the top of the enclosure structure 12 over the control knobs 84, 86 of the radio 80. A removable bottom cover 24 is positioned in a water-tight manner to enclose and seal the bottom of the enclosure structure 12 after the radio is inserted therein. Therefore, when a portable radio or tape player is positioned in the interior chamber of the enclosure 12 and the bottom cover 24 is in closed position, the radio will be protected from any water around the exterior of the enclosure 12 so that it can function without shorting out or other interference or damage that water can cause to the electronic components thereof.

The waterproof earphone set 50 is provided to produce sound from the electrical impulses generated by the radio and to direct the sounds into the person's ears, while protecting the speaker components from water and preventing water from interfering or distorting the sound as it is directed to the person's ear.

As best shown in FIGS. 2 and 3, and 4, the flexible, water-impermeable top cover 30 is positioned around the upper edges of the front, side, and rear panels 14, 16, 18, and 20, respectively. The cover 30 is essentially in the form of a box having a front panel 34, right side panel 36, left side panel 38, and rear panel 40 corresponding in size and shape to the upper peripheral surface of the enclosure 12. A flexible top panel 42 extends between the front, side, and rear panels 34, 36, 38, and 40, respectively, of the top cover 30 for completely enclosing the top of the structure 12. The front, side, and rear panels 14, 16, 18, and 20, respectively, have recessed portions 22 at the upper ends thereof approximately corresponding in thickness to the thickness of the flexible cover 30 to form a smooth continuous contour along the sides thereof. Preferably, the cover 30 is permanently sealed in this closed position around the upper peripheral surface of the enclosure 12 by a suitable waterproof adhesive product, such as "90 Spray Adhesive" distributed by 3M Company, St. Paul, Minn. 55144.

An inwardly-turned lip 23 is provided at the upper ends of the panels of enclosure 12 to bear against the top surface of the radio 80, as best shown in FIG. 4. Therefore, when the bottom cover 24 is in closed position, as also shown in FIG. 4, the radio is held in substantially immovable position within the enclosure 12. The bottom cover 24 is preferably fabricated of a resilient, water-impermeable material, such as rubber, with a portion thereof sized and adapted to be inserted a short distance into the interior chamber of enclosure 12 as shown in FIGS. 2, 3, and 4. An enlarged rib or bead 28 protruding outwardly from the perimeter of the bottom cover 24 provides a waterproof seal between the cover 24 and the panels of enclosures 12, and a flange 26 extending outwardly from the bottom of cover 24 seals against the bottom ends of the panels of enclosure 12.

The top panel 42 of the flexible, water-impermeable top cover 30 is preferably positioned a spaced distance above the radio 80 in the enclosure 12 to enhance the flexibility required to manipulate the control knobs 84, 86 of the radio 80. The top panel 42 has preformed therein a plurality of recessed pockets 46, 48 positioned adjacent the control knobs 84, 86 of radio 80, and they are sized and adapted to receive the end of a person's finger F as best shown in FIG. 4. Knurled surfaces 47, 49 can be provided on the interior surfaces of recessed pockets 46, 48, respectively to enhance engagement of the flexible membrane with the control knobs 84, 86. The resiliency and flexibility of the top cover 30, as enhanced by the structure of the recessed pockets 46, 48 therein allow a person to easily manipulate and turn the control knobs 84, 86 of the radio as shown in FIG. 4. For example, when the person's finger F is positioned in the pocket 46 to depress the interior surface 47 of the pocket 46 into contact with the control knob 84 and then moved laterally to the position shown in broken lines of 46', the control knob 84 will be turned to the right. Just as easily, the finger F could be moved in the opposite direction to turn the control knob 84 to the left. The preformed recessed pockets cause the membrane to follow the movement of the finger for precise and easy operation. Therefore, a person can very easily manipulate the control knobs 84, 86 of the radio 80 through the flexible membrane of the top cover 30, without breaking the waterproof seal of the enclosure 12. It is also preferably, although not necessary, to have at least the front panel 14 of the enclosure 12 transparent so that the user can see the frequency dial 88 of the radio for ease in tuning to the desired frequency.

The waterproof earphone set 50 is comprised of two earphones 60, a cord 54 comprised of wires 56, 58 leading to respective speakers 60, and a male plug 52 adapted for connection with a corresponding female jack receptacle 82 and the radio. The earphone 60 includes a conventional miniature speaker component 66 capable of producing sounds from electrical impulses generated by the radio 80. The water-impermeable, insulated wire 56, 58 is connected into the back portion of the speaker component 66, and a waterproof thickened covering 62 is positioned over the end portion of the wires 56, 58 that is connected to the speaker component 66 to prevent flexing and ultimate breaking of the wire connection to the speaker component 66.

In order to seal the speaker assembly 66, and primarily the connection of the wire 56, 58 to the speaker assembly 66, from water, a flexible, water-impermeable boot 70 in the form of an elongated sleeve is positioned over the speaker assembly 66, as best seen in FIG. 4. The rear portion 72 of the boot 70 is positioned over the speaker assembly 66 and extends rearwardly and downwardly into contact with an annular rubber grommet 64 positioned around the thickened wire protector 62. The grommet 64 is preferably sealed in a waterproof manner to the wire protector 62 by a suitable waterproof adhesive product such as "90 Spray Adhesive" distributed by 3M Company, St. Paul, Minn. 55144. The rear portion 72 of the boot 70 is also preferably sealed to the peripheral surface of the grommet 64 by such a suitable waterproof adhesive. In this manner, the wire connection to the speaker assembly 66 is sealed from water on the exterior thereof.

The front portion 74 of the boot 70 extends a spaced distance forwardly of the speaker assembly 66 in a converging shape that is sized and adapted to fit into a person's ear. The interior of the front portion 74 is hollow and preferably conical shaped to conduct sound generated by the speaker assembly in a uniformly converging manner to the smaller opening 76 at the distal end thereof which is adapted to be positioned in the person's ear canal. The conical-shaped interior is preferable, although not essential, in that it captures the sound generated from essentially the full cross-sectional area of the speaker assembly 66 and converges it uniformly to the opening 76 for optimum sound quality delivered to the person's ear.

While water is normally not damaging to the front surface of the speaker assembly 66, it is preferably to keep water out of the interior of the boot 70, because water would interfere with the sound quality and clarity. Therefore, a plurality of enlarged annular collars 77, 78, 79 are positioned around the peripheral surface of the front portion 74 of boot 70 to provide a waterproof seal between the boot 70 and the person's ear canal. These collars are preferably shaped with a longer incline on the forward surface when the rear surface for resisting withdrawal of the boot 70 from the ear. Therefore, in addition to providing a waterproof seal, the collar 77, 78, 79 also help to secure the boot 70 in the person's ear.

As mentioned above, the male plug 52 on the opposite end of the cord 54 extends through the top panel 42 of the water-impermeable membrane 30 so that it can be plugged into the female receptacle or jack 82 in the radio 80. An opening defined by the inwardly-turned rim 44 in the upper panel 42 defines the opening in the membrane through which the plug jack 52 is inserted. It is preferred that the rim 44 be permanently sealed in a waterproof manner by a waterproof adhesive such as the "90 Spray Adhesive" mentioned above in order to maintain the integrity of the waterproof seal. Since nay portable radios can be turned on and off, however, by unplugging the plug 52 from the radio 80, it is preferred that there be sufficient flexibility in the membrane 30 to allow the plug 52 to be unplugged from the radio 80 without breaking the waterproof seal. For example, as best shown in FIG. 4, when the plug 52 is withdrawn approximately ⅜" to the position shown in broken lines at 52', there is sufficient flexibility in the top panel 42 of impermeable membrane 30 so that it can be deformed to the position shown by broken lines at 42', while still maintaining the waterproof seal of the enclosure 12. In this manner, the plug 52 can be plugged into and unplugged from radio 80 without removing the plug 52 or the radio 80 from the enclosure 12.

Embodiments of the present invention have been shown and described with a degree of particularity to enable a complete and full understanding of those embodiments. It should be understood, however, that the present invention involves inventive concepts defined in the appended claims, and these inventive concepts are not intended to be limited by the detailed description herein beyond that required by the prior art and as the claims are allowed. The Waterproof Enclosure for Portable Radio or Tape Players of the present invention can take other forms and is susceptible to various changes in detail of structure without departing from the principles of this invention.

What I claim is:

1. A waterproof enclosure for a portable radio, comprising:

waterproof enclosure housing means for containing and enclosing a portable radio that is equipped with control knobs, a portion of said enclosure housing means adjacent said radio control knobs being a flexible, water impermeable membrane that is easily deformable by an operator's finger, wherein said flexible membrane is positioned a spaced distance away from said radio and includes a preformed, recessed pocket adjacent said control knob where said membrane approaches said control knob more closely than the portions of the membrane surrounding said recessed pocket and is knurled adjacent said control knob and sufficiently flexible to allow both up and down movement as well as lateral movement of said recessed pocket for manipulating the control knob; and a waterpoof earphone comprised of a speaker component, electrical wire leads for connecting said speaker component to said radio, and waterproof boot means covering said speaker component and preventing water from contacting the connection of the wire leads to the speaker component, for mounting said earphone in a person's ear in a waterproof manner, and for directing sounds produced by said speaker component into the person's ear.

2. A waterproof enclosure for a portable radio, comprising:

waterproof enclosure housing means for containing and enclosing a portable radio that is equipped with control knobs, wherein said waterproof enclosure housing means has an opening and a removable waterproof cover, said cover including seal means for sealing said opening against influx of water into said waterproof enclosure housing means when said cover is in closed position, and wherein a portion of said enclosure housing means adjacent said radio control knobs is a flexible, water impermeable membrane that is positioned a spaced distance away from said radio adjacent said control knob and includes a preformed, recessed pocket adjacent said control knob and is easily deformable by an operator's finger; and a waterproof earphone comprised of a speaker component, electrical wire leads for connecting said speaker component to said radio, and waterproof boot means for covering said speaker component and preventing water from contacting the connection of the wire leads to the speaker component, for mounting said earphone in a person's ear in a waterproof manner, and for directing sounds produced by said speaker component into the person's ear.

3. The waterproof enclosure of claim 2, wherein said water proof enclosure housing means is comprised of a rigid box enclosure having front, rear, right side, and left side panels which define an interior chamber, a flexible membrane in the form of a box-shaped cover sized and shaped for fitting over and closing the top of said rigid box enclosure, said flexible membrane cover having a front, rear, right side and left side panels, sized and shaped for fitting tightly over the top ends of the corresponding front, rear, and side panels of said rigid box enclosure, and a flexible membrane top panel extending between said front, rear, and side panels of said flexible membrane for enclosing the top of said chamber in a waterproof manner.

4. The waterproof enclosure of claim 3, wherein said removable waterproof cover is sized and shaped for inserting into the bottom end of said rigid box enclosure and includes sealing means around its perimeter for sealing said cover against the bottom ends of said front, rear, and side panels.

5. The waterproof enclosure of claim 4, wherein a portion of said enclosure is transparent to provide visual access to the interior of the chamber.

6. A waterproof enclosure for a portable radio, comprising:

waterproof enclosure means for containing and enclosing a portable radio that is equipped with control knobs, wherein a portion of said enclosure housing means adjacent said radio control knobs is a flexible, water impermeable membrane that is easily deformable by an operator's finger; and a waterproof earphone comprised of a speaker component, electrical wire leads with plug connector means attached thereto for electrically connecting said speaker component to said radio, and waterproof boot means for covering said speaker component and preventing water from contacting the connection of the wire leads to the speaker component; and wherein said plug connector means extends through said flexible membrane from the exterior to the interior of said waterproof enclosure means adjacent a corresponding jack receptable in said radio in such a manner that said flexible membrane and the periphery of said plug connector means that extends through said flexible membrane are joined in a fixed, waterproof, and immoveable manner to each other, and wherein said flexible membrane adjacent said plug connector means has sufficient flexibility to allow said plug connector means to be electrically connected to and disconnected from said radio while the waterproof joint connection between said membrane and said plug connector means remains intact.

7. Waterproof earphone apparatus for a portable radio and the like, comprising:

electrically driven speaker means for producing sound in respone to electrical impulses generated by the radio, including water impermeable insulated wire leads connected to said speaker means for conducting electrical impulses to the speaker means, and a water impermeable boot for covering said speaker means and for mounting said speaker means adjacent a person's ear and directing sound produced by said speaker means into a person's ear, said water impermeable boot including an elongated flexible sleeve, the rear portion of which is positioned around the peripheral surface of said speaker means in such a manner as to seal the connection of said wire leads to speaker means from water, and the front portion of which encloses a hollow interior chamber extending forward from the periphery of the speaker means in a converging manner to an open distal end in a size and shape for insertion into a person's ear, and including a plurality of annular collars protruding radially outwardly from the external surface of said front portion of said boot means for forming a waterproof seal between said boot means and the person's ear.

8. The waterproof earphone apparatus of claim 7, including a resilient annular grommet positioned around said wire lead at its point of connection to said speaker means, said grommet being sealed with a waterproof adhesive to said speaker means and toe said wire lead, and wherein the rear end of said sleeve is sealed in a waterproof manner to the peripheral surface of said grommet.

* * * * *

UNITED STATES PATENT AND TRADEMARK OFFICE
CERTIFICATE OF CORRECTION

PATENT NO.  : 4,584,718

DATED       : April 22, 1986

INVENTOR(S) : Kip L. Fuller

It is certified that error appears in the above-identified patent and that said Letters Patent is hereby corrected as shown below:

Column 4, line 65, delete "nay" and substitute --many--.

Column 5, line 4, delete "3/8"" and substitute --1/8"--.

Column 8, line 13, delete "toe" and substitute --to--.

Signed and Sealed this

Fourteenth Day of April, 1987

*Attest:*

DONALD J. QUIGG

*Attesting Officer*  *Commissioner of Patents and Trademarks*